April 22, 1947. G. HOHWART 2,419,263
SCREW THREAD GAGE
Filed May 28, 1943 3 Sheets-Sheet 1
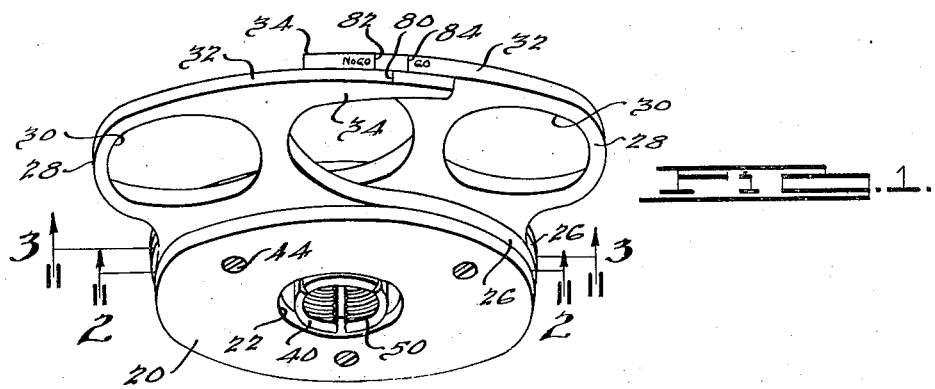
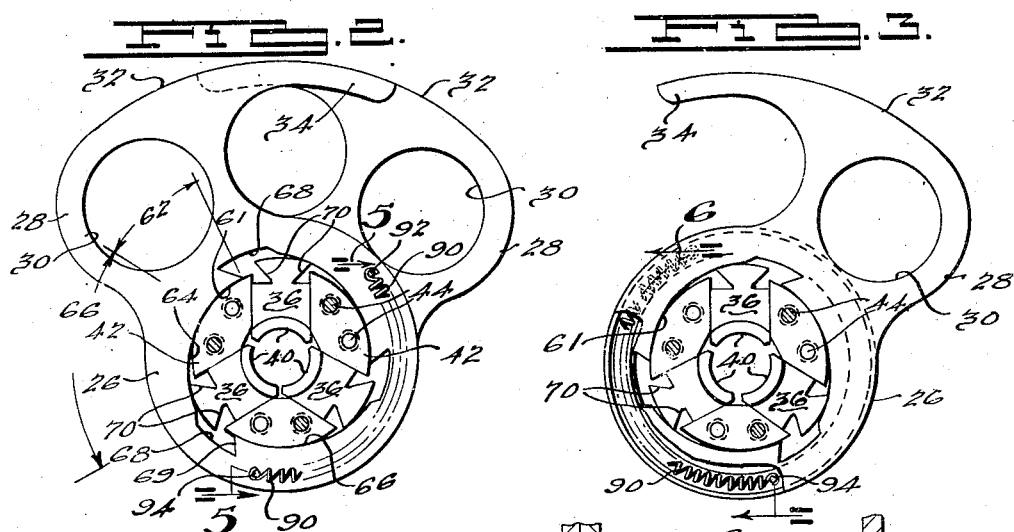
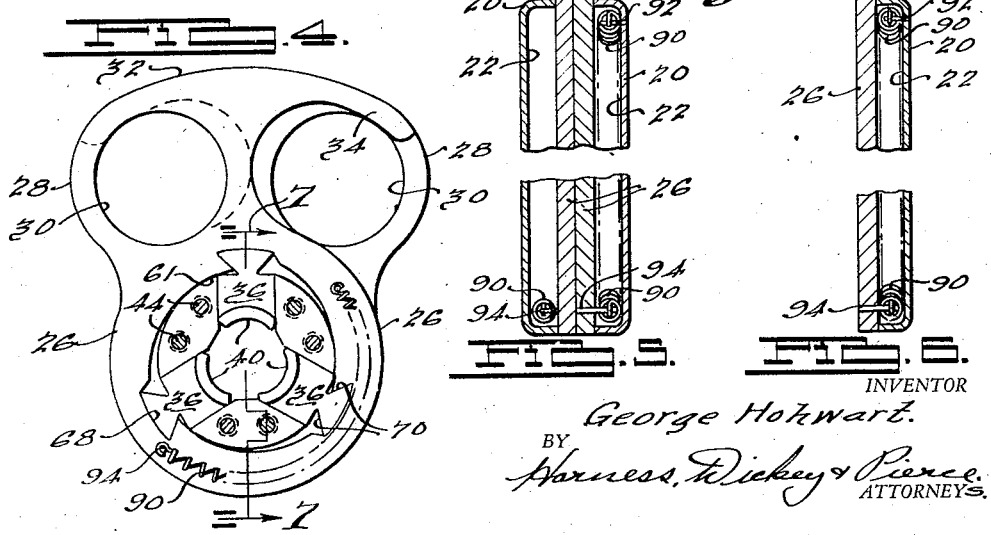
INVENTOR
George Hohwart.
BY Harness, Dickey & Pierce.
ATTORNEYS.

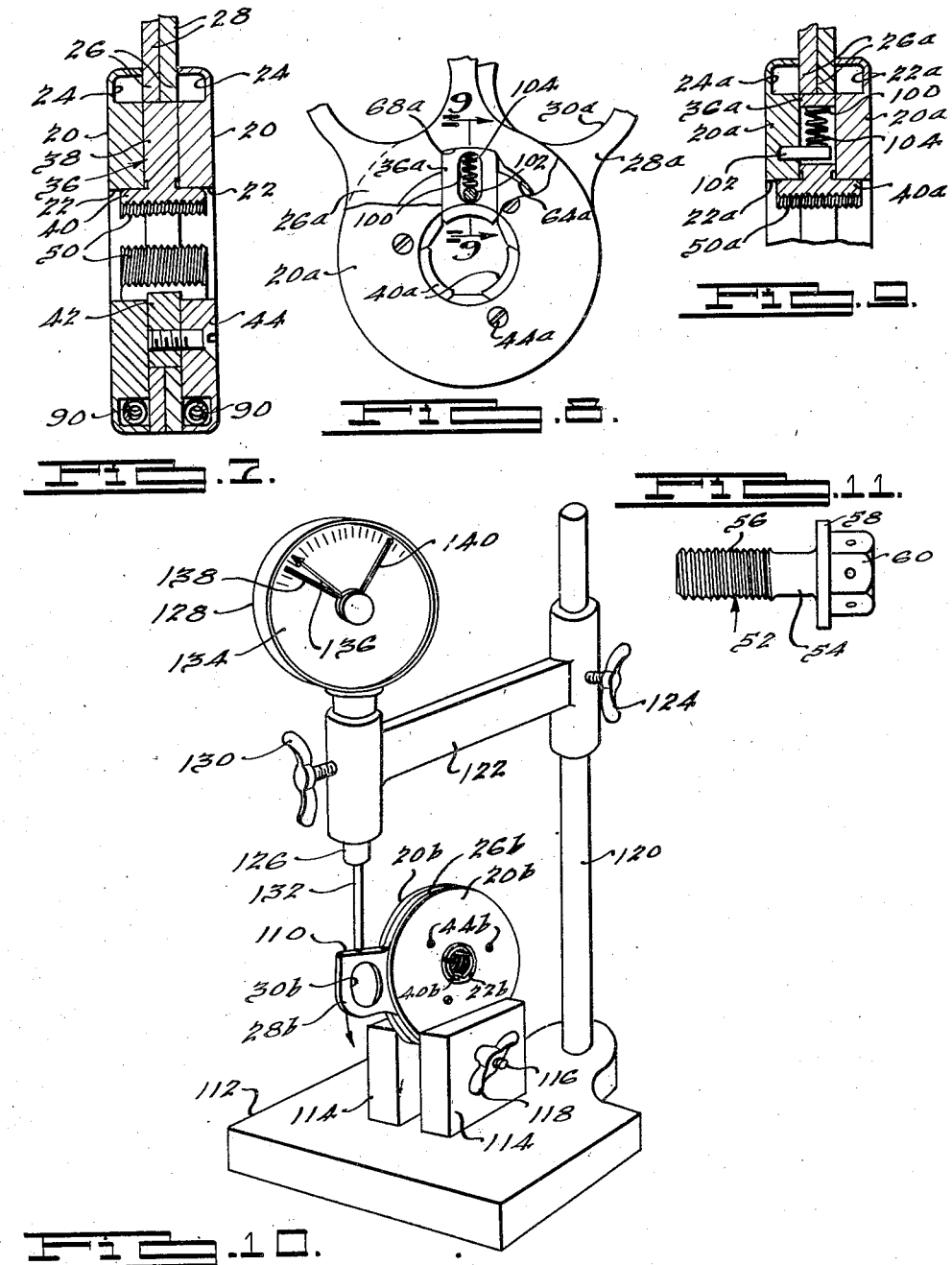

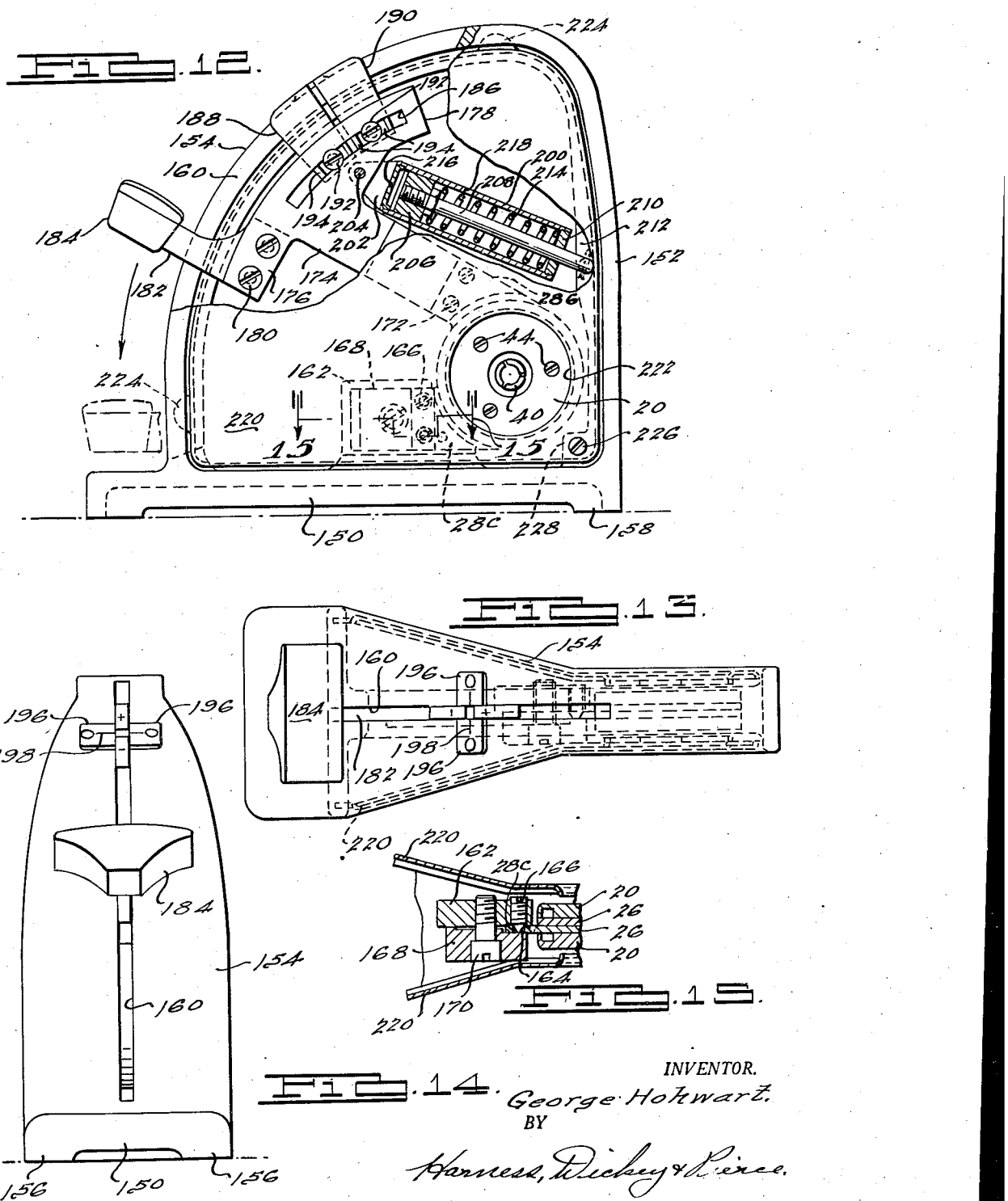

Patented Apr. 22, 1947

2,419,263

UNITED STATES PATENT OFFICE 2,419,263

SCREW-THREAD GAGE

George Hohwart, Orchard Lake, Mich., assignor to N. A. Woodworth Company, Ferndale, Mich., a corporation of Michigan Application May 28, 1943, Serial No. 488,846

12 Claims. (Cl. 33—199)

This invention relates to gage devices and particularly to gage devices for determining whether the pitch diameter of threaded parts falls within the tolerated dimensions therefor, the principal object being the provision of a device of this type by the use of which threaded parts may be gaged in a quick and accurate manner.

Objects of the invention include the provision of a gage device of the so-called ring thread gage type but which eliminates the necessity of threading the threaded part into and out of the gage as is necessary in connection with conventional ring thread gages and eliminates the need of using two separate gages in determining whether the threaded part to be gaged is both above the lower tolerance limit and below the high tolerance limit for such part; the provision of a gage device of the type described in which the gaging surface thereof is made up of a plurality of relatively movable portions the positions of which with respect to the axis of the work being gaged thereby is employed to indicate whether the pitch diameter of such work falls within the minimum and maximum tolerances therefor; the provision of a gage device of the type described in which the inwardly and outwardly movable gage members are controlled in their movement by cooperating cam surfaces movable circumferentially with respect to the axis of the work being tested thereby; the provision of a construction as above described in which engagement of the inwardly and outwardly movable gaging members into contact with a piece of work to be gaged is accomplished through the use of spring means, thus insuring the same amount of gripping force of the gaging members on the work under all circumstances; the provision of a construction as above described so constructed and arranged as to rapidly withdraw the gaging members from work engaging position after the gaging members have been moved a slight distance outwardly from approximately their effective work engaging positions, thereby to permit the work to be freely withdrawn axially from between the gaging members; the provision of a gage device of the type descirbed in which two members movable circumferentially with respect to the axis of the workpiece being tested are provided with cam surfaces cooperating with the inwardly and outwardly movable gage members to control such movement thereof, such circumferentially movable members being movable in opposite directions of rotation about the axis of the work being gaged by the device during movement of the gage members in the same direction, and being provided with cooperating surfaces carrying indicia and indicating the relative size of the workpiece gaged thereby; and the provision of a gage device of the type described so constructed and arranged as to eliminate the necessity of exceedingly fine and close workmanship in its production without affecting the accuracy in the gaging ability of the device.

Further objects of the invention include the provision of a bench type of gage including a gage device of the type above described including a frame or housing in which the gage device is received and secured, an indicating member associated with the gage device cooperating with a surface of the housing to indicate the relative size of the piece being gaged thereby; the provision of a bench type of gage as above described in which the gage device itself is supported in the housing by means of one of its relatively movable members and an indicator or pointer is fixed to the remaining relatively movable member; the provision of a bench type of gage as above described having a novel arrangement for varying the positions of the tolerance indicating marks thereof; the provision of a bench type of gage as above described including a novel form of housing structure; the provision of a bench type of gage as above described including a novel means for supporting the gage device itself therein; and in general the provision of a bench type of gage of the new and novel construction embodying the type of gage device first described herein.

The above being among the objects of the present invention the same consists in certain novel details of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a perspective and more or less side elevational view of a gage device embodying the principles of the present invention;

Fig. 2 is a sectional view of the gage device shown in Fig. 1 taken as on the line 2—2 of Fig. 1, it being equivalent to a side elevational view of the device with the housing member on the near side thereof removed;

Fig. 3 is a sectional and partially broken view taken on the line 3—3 of Fig. 1, it being equivalent to a side elevational view of the device with the housing member on the near side and the first actuating cam member removed;

Fig. 4 is a view similar to Fig. 2 but illustrating the device in its expanded condition in which it is adapted to receive a workpiece therein;

Fig. 5 is a fragmentary developed sectional view taken on the line 5—5 of Fig. 2;

Fig. 6 is a fragmentary developed sectional view taken on the line 6—6 of Fig. 3;

Fig. 7 is an enlarged, fragmentary transverse sectional view taken centrally through the gage device as on the line 7—7 of Fig. 4;

Fig. 8 is a partially broken, fragmentary side elevational view of a modified form of gage device;

Fig. 9 is an enlarged fragmentary, transverse sectional view taken on the line 9—9 of Fig. 8;

Fig. 10 is a perspective view illustrating a bench mounting arrangement for a gage device constructed in accordance with the present invention but in which the gage device is provided with a single operating member;

Fig. 11 is a side elevational view of a screw such as may be advantageously gaged by a gage device constructed in accordance with the present invention;

Fig. 12 is a partially broken, side elevational view of another and modified form of bench gage embodying a gaging device of substantially the same construction as illustrated in Figs. 1 to 7, inclusive;

Fig. 13 is a plan view of the bench type of gage illustrated in Fig. 12;

Fig. 14 is a front elevational view of the bench type of gage illustrated in Fig. 12; and, Fig. 15 is a fragmentary, transverse sectional view taken on the line 15—15 of Fig. 12 and illustrating in greater detail the means provided for mounting the gaging device in the housing or frame of this modified form of bench type of gage.

Screw threaded parts such as bolts and screws or the like the pitch diameters of which are required to be held within relatively close limits are conventionally gaged by means of "go" and of "no-go" thread ring gages. These thread ring gages are either solid or split rings having a threaded bore, the bore of the "go" gage being such that the part to be gaged must be capable of threading through the same to insure the pitch diameter of the part being no greater than the maximum tolerance allowed for the part, and the threaded bore of the "no-go" gage being of such dimension that if the part to be gaged can be threaded into it, it indicates that the work is of smaller pitch diameter than that permitted and, therefore, is not within the limits of size permitted.

It will be appreciated that in employing these conventional types of thread ring gages for gaging a large number of threaded parts it requires that each of such parts be threaded as completely as possible into the "go" gage and an attempt at least made to thread each of such parts into the "no-go" gage and such threading must be accomplished by hand and, particularly with the "go" gage, each part must be manually rotated as many number of times as there are threads in the length of the part to be gaged. Under the conditions existing at the time this application was filed immense quantities of threaded parts of extremely accurate character were required in the war effort and the work and manpower required to gage these threaded parts by conventional thread rings was enormous. The present invention has been devised to effect the same character of gaging of screw threaded elements as is accomplished by conventional thread ring gages but by means of which the greater proportion of the work required in such gaging operations by conventional types of threaded ring gages is eliminated, thus not only reducing the amount of time required for such gaging operations but permitting a corresponding number of parts to be gaged by a materially less number of workmen, thus releasing them for other important work.

Referring now to the accompanying drawings and particularly to Fig. 7 it will be noted that the device comprises a pair of oppositely disposed and substantially identical housing members 20 each of ring-like conformation and having a bore 22, and arranged in opposed and concentric relation to each other. The members 20 in the particular construction shown by way of illustration are generally of constant thickness throughout but each is provided on its inner face and adjacent its periphery with an annular concentric groove 24 therein the purpose of which will be hereinafter more fully explained.

Received between the housing members 20 are a pair of identical operating members each comprising a generally ring-like main body portion 26 and an extended handle portion 28. The peripheral outer edge portion of the main body portion of each operating member 26 is of circular conformation except over the width of the handle portion 28 which projects radially outwardly therefrom and is provided with a finger or thumb hole 30 therein. The peripheral outer edge portion of each handle portion 28 is formed to provide a surface 32 lying in a circle concentric with the bores 22 of the main body portions 20 and such outer edge is circumferentially extended as at 34 for a purpose which will hereinafter be more fully explained. It will be noted, however, that the extended portion 34 of each of the operating members 26 is extended circumferentially in opposite directions about the axes of the bores 22 so as to overlap each other even when the operating handle or portions 28 are separated from one another the maximum permissible extent.

Received between the housing members 20 and within the annular body portion of the operating members 26 are a plurality of gaging members indicated generally at 36 and while there may be two or more of such gaging members, it is preferable to employ three as shown. Each gaging member 36 comprises a radially directed main body portion 38 carrying at its inner end a laterally extending head 40 and the three gaging members 36 are arranged in equally angularly spaced relation about the axis of the bores 22. The main body portions 38 of the gaging members 36 are preferably straight sided as shown and are of the same thickness as the combined thicknesses of the two operating members 26 as brought out in Fig. 7. The heads 40 are extended in the direction of the axes of the bores 22 and are received in such bores as indicated.

The gaging members 36 are guided in their movement radially of the bores 22 by means of three segmentally shaped members 42 received within the operating members 26 one between each adjacent pair of gaging members 36. Each gaging member 36 is thereby confined between the adjacent faces of cooperating pairs of segment members 42 and guided thereby for movement radially of the bores 22.

The housing or cover members 20 are fixed relative to each other and to the segment members 42 by means of screws 44 which, as best brought out in Fig. 7, project through each cover member 20 and thread into the various segment members 42. The segment members 42 thus serve as a means for tying the cover members 20 together. The segment members 42 are preferably of slightly greater thickness than the thickness of the main body portion 28 of the gaging members 36 and consequently of slightly greater thickness than the combined thicknesses of the members 26 so as to insure free radial movement of the gaging members 36 and the operating members 26 between the housing members 20 at all times.

In order for the gaging members 36 to function as gaging members the radially inner faces of the head portions 40 thereof are of generally partially cylindrical conformation and each is provided with a plurality of thread-like ribs 50 thereon which are complementary to that portion of the threaded surface of a bolt, screw, stud or the like to be gaged and received simultaneously between all of the gaging members 36. As illustrative of the work which may be gaged by the device the screw indicated generally at 52 in Fig. 11 is shown including a shank 54 joined at one end to the threaded body 56 thereof and at its other end to a circular concentric flange 58 on the opposite side of which the head 60 is formed.

Assuming for the instant that the threads or ribs 50 of the various gaging elements 36 are formed for complementary reception on the threaded body portion 56 of the screw 52, the various ribs 50 of each of the gaging members 36 will be understood to be positioned in continuation of the same helical line as the corresponding ribs 50 of the remaining gaging members 36, and that when the various gaging members 36 are moved radially inwardly until the threads or ribs 50 thereof are in firm and complementary engaging relationship with respect to the threads on the body portion 56 of the screw 52 they form in effect exactly the same type and character of gaging surface as is provided in a conventional thread ring gage. One thing will be appreciated, of course, and that is that the threads 50 of the gage members 38 are initially formed to be exactly complementary in size and substantially complementary in shape and contour to the threaded surface of the part to be gaged when such threaded part is at the maximum tolerated limit of its pitch diameter. This is desirable, of course, so that when the gaging members 36 are actively gaging the surface of a part having a pitch diameter greater than that permitted by the minimum tolerated pitch diameter for the part, they will not ride on the surface of the part to be gaged at their circumferentially outer edges only, but rather at the center thereof.

It will be appreciated that movement of the operating members 26 about the axis of the bores 22 is relied upon to move the gaging members 36 radially into and out of gaging relation with respect to a piece of work to be gaged. For this purpose and as indicated in Fig. 2 the radially inner edge of each operating member 26 at equally angularly spaced points therearound corresponding in number to the number of gaging members 36 provided, in the case illustrated three, is formed for a short distance circumferentially thereof as indicated at 61, as for instance for a distance indicated by the arrows 62 in Fig. 2, as part of a circle concentric with the axis of the bores 22 and of such member 26 and of such diameter as to slidably engage the radially outer surfaces of the segment members 42 but with enough clearance to permit shifting of the members 26 relative to the segment member 42 for centralizing purposes. One end of each such surface 61 of each member 26 is joined to one end of contiguous cam surface 64 also formed on the radially inner face of such member 26 and each of which extends about the axes of the bores 22 or of the members 26 over an angular extent such as indicated by the arrow 66 in Fig. 2. The cam surfaces 64 of the members 26 extend in the same direction about the axis thereof from the associated partially circular surface 61 referred to, such cam surfaces 64 extending in a counterclockwise direction from the associated circular portion 61 in the near member 26 as viewed in Fig. 2. Each cam surface 64 is identical to each other cam surface 64 and each is formed so that each increment of length thereof extending away from the contiguous partially circular portion 61 is located at a slightly greater radial distance from the axis of the associated member 26, and the outer ends of the gaging members 36 are rounded off as shown and are adapted to ride upon or engage the corresponding one of such cam surfaces 64. It will, therefore, be appreciated that when the various gaging members 36 are in the position illustrated in Fig. 2, for instance, and the near member 26 as viewed in Fig. 2 is rotated in a counterclockwise direction from the position shown, the cam surfaces 64 in riding over the outer ends of the gaging members 36 will act to force the gaging members 36 radially inwardly, and where a screw threaded part such as the part 52 shown in Fig. 11 is positioned within the gaging member 36, will cause the gaging members 36 to closely embrace the same.

The cam surfaces 64 are of a very gradual nature so that a substantial angular movement of the members 26 is required to effect a slight radial movement of the cooperating gaging members 36. The relative ratio of such angular movement of the members 26 with respect to the radial movement of the gaging members 36 through interengagement of the cam surfaces 64 therewith provides the necessary magnification of indicated movement of the gaging members 36 to provide the desired visual indication of the relative size of the part to be gaged.

It will be appreciated that outward movement of the gaging members 36 must be provided for to such an extent that the circle defined by their inner faces when they are at the outer limit of their radial movement will be greater than the outside diameter of the threads of the part to be gaged in order to permit such part to be inserted between and removed from the gaging member 36 without requiring it to be threaded thereinto or therefrom. It will also be appreciated that with the desired gradual rise of the cam surfaces 64 this would be substantially impossible where three or more gaging members 36 were employed without unduly cutting down the magnification of the movement of the gaging members 36 with respect to the rotating movement of the members 26 and, additionally, it would require an undue amount of rotational movement of the members 26 to effect this result.

Accordingly, in order to provide the desired gradual rise of the cam surfaces 64 and yet permit the gaging members 36 to be projected outwardly a desired amount upon a relative restricted rotational movement of the members 26, each member 26 angularly beyond that end of the cam surface 64 opposite the associated circular portion 61 is formed to provide a radially outwardly offset pocket portion 68 the radially outer edge of which may be concentric with the axis of the members 26. The side edges of such pocket are parallel with each other but disposed obliquely with respect to a line radial of the members 26 and are inclined in a direction such that a reentrant angle is provided between the side edge of the pocket and the radially outer edge thereof on that side thereof opposite the end of the cam surface 64 next adjacent thereto so as to provide a cam surface 69 at one side of each pocket 68.

The outer end of each gaging member 36 in the construction illustrated in Figs. 1 to 7, inclusive, is notched out on opposite sides thereof to provide a cam surface engageable with the cooperating surfaces 69 of the operating members 26 to rapidly withdraw the gaging members 36 radially during relative rotation of the operating members 26. While the shape of such notches may vary considerably in obtaining this effect, in the particular construction shown the notches provide a cam surface 70 on each side of each gaging member 36 which cam surfaces 70 are inclined so as to extend both radially and transversely inwardly from the outer corners of the gaging members 36, such angularity being complementary to the angularity of the cam surfaces 69 of the pockets 68. The width of the pockets 68 measured circumferentially of the members 26 is sufficient to enable the notched out outer ends of the gaging members 36 to be received therein. Thus as the near member 26, as viewed in Fig. 2, is turned in a clockwise direction to permit radial withdrawal of the gaging members 36 in contact with the cooperating cam surfaces 64, the cam edges 69 of the pockets 68 will be brought into contact with the cooperating cam surface 70 of the cooperating gaging members 36 and, upon continued rotational movement of the near member 26 in a clockwise direction and because of the relative angularity of the surfaces 69 and 70, will cause the gaging members to be quickly radially withdrawn into the pocket 68 in the manner illustrated in Fig. 4. This withdrawal of the gaging members 36 through inter-engagement of the cam surfaces 69 and 70 is sufficient to expand the opening defined by the inner ends of the gaging members 36 to such an extent to permit free and unrestricted passage of the threaded end of the workpiece into and out of the space between the inner ends of the gaging members 36, and the movement of the gaging members 36 under such conditions amounts to a substantially snap movement. Full engagement of the surfaces 69 and 70 as indicated in Fig. 4 also serves to limit further rotational movement of the members 26 with respect to the gaging members 36 and the housing 20 in such direction as will be readily appreciated. The cam surfaces 69 and 70 will always be positioned to become engaged as above described for the reason that the gaging members 36 will never move inwardly to a sufficient extent as to engage their outer ends with the surfaces 61, and will, therefore, always be projected outwardly beyond the radially inner edges of the cam surfaces 69. Those edges of the pockets 68 opposite the edges 69 thereof also act as cam surfaces cooperating with the outer ends of the gaging members 36 to project them radially inwardly out of the pockets 68 when the members 26 are turned from the position shown in Fig. 4, in a direction opposite to that above described, as will be readily appreciated.

Where two members 26 are employed as illustrated in Figs. 1 to 7, inclusive, and inter-engaging surfaces such as 69 and 70 are employed for the rapid withdrawal of the gaging members 36 for the purpose stated, then the members 26 which are identical to each other are simply reversed in direction as indicated, that is so that the surfaces 69 of one member 26 will engage the cam edges 70 of all of the gaging members 36 on one side thereof and the surfaces 69 of the other member 26 will engage the opposite cam surface edges 70 on the other side thereof. As a result the members 26 move in opposite directions of rotation about their centers and about the axes of the bores 22 in the housing portions 20 when operated to move the gaging members 36 either inwardly or outwardly. Thus in the construction illustrated, in order to move the gaging members 36 radially inwardly the near member 26 as illustrated in Fig. 2 is caused to rotate in a counterclockwise direction of rotation while the far member 26 is simultaneously caused to rotate in a clockwise direction of rotation, but the action between both members 26 and the gaging members 36 under such conditions will be identical.

The use of the two members 26 turning in opposite directions not only serves to equalize the thrust of the cam surfaces 64, or the cam surfaces 69 as the particular case may be, upon the various gaging members 36, but also provides a means whereby the radial movement of the gaging members 36 as visually indicated by relative movement of the members 26 is twice as great as the relative movement between one of the members 26 and the housing portions 20, for instance. In other words, inasmuch as each member 26 moves relative to the housing portion 20 a predetermined extent under any condition, because the members 26 move in opposite directions during a gaging movement thereof they will move relative to each other twice such distance. Furthermore, if this relative movement between the members 26 is indicated by suitable indicia provided on the surfaces 32 thereof located at a maximum radial distance from the center of the device, it will be appreciated that a maximum visual indication of the relative movement of the gaging members 36 at or adjacent the gaging positions thereof will be provided.

Advantage is taken of the above fact and, as indicated in Fig. 1, to provide the surface 32 of the extension 34 of each member 26 with indicia to indicate the relative positions of these parts when the gaging members 36 are in a position to gage a part of the maximum tolerance limit and at the minimum tolerance limit thereof. Accordingly, as illustrated in Fig. 1, the surface 32 of one of the extensions 34 is provided with so-called pointer mark 80 extending transversely thereof, and the surface 32 of the overlapping end 34 of the other member 26 is provided with a mark such as 82 which will be aligned with the pointer mark 80 for a part at the maximum limit of the tolerated pitch diameter thereof, and a similar mark 84 which when aligned with the pointer mark 80 will indicate the minimum tolerated limit for the pitch diameter for the part being gaged. Accordingly, when the members 26 are operated to move the gaging members 36 into firm engagement with a part to be gaged thereby, if the pointer member 80 falls circumferentially between the marks 82 and 84 it will show that the part being gaged is within the tolerated limit for the pitch diameter thereof, and if not that the part is beyond such tolerated limits and is not acceptable.

The thumb or finger holes 30 in the handle portions 28 of the operating members 26 permits an operator to place a thumb through one of the openings and a finger through the other to effect relative rotational movement between the members 36 during a gaging operation. The handle portions 28 may, as will be readily appreciated, be so related to each other circumferentially of the device so that they may require to be either moved circumferentially toward each other to bring the gaging members 36 radially inwardly into contact with a piece of work, or circumferentially away from one another to move the gaging members 36 radially inwardly into contact with a piece of work. In either instance if the relative movement of the members 26 with respect to each other toward gaging position was effected manually, then the reading of the size of the work as indicated by the marks 80, 82 and 84 on the portion 34 thereof might vary to a slight extent depending upon the amount of pressure applied by one operator as compared to the corresponding pressure exerted by another operator and it is, therefore, desirable that any variation because of such reasons be eliminated if possible.

It will be appreciated that spring means may be provided for urging the members 26 rotatably with respect to each other in a direction opposite to that caused by the pressure of the operator upon them and regardless of the direction of movement of the gaging members 36 under such conditions. If such spring pressure is employed to rotate the members 26 relative to one another so as to move the gaging members 36 into gaging relation with respect to the piece of work, then it will be assured that the gaging pressure applied to the work in each instance will be identical and the possible disadvantage above referred to where such pressure is dependent upon that applied by the operator is definitely eliminated. Accordingly, in the arrangement of parts shown the handle portions 28 of the members 26 are so positioned with respect to each other than when an operator causes them to approach each other, from the position illustrated in Fig. 2 for instance and to a position such as illustrated in Fig. 4, the gaging members 36 are actuated in a radially outwardly direction, and spring means are provided for urging the handle portions 28 away from each other so as to bring the gaging members 36 radially inwardly into gaging relation with respect to the piece of work.

The particular spring means employed for this purpose are illustrated as coil springs 90 one of which is located in each of the annular grooves 22 in the body members 20. As illustrated in Figs. 5 and 6 one end of each spring 90 is anchored on a pin 92 fixed in the bottom of the coresponding groove 22 centrally thereof and its opposite end is anchored to a pin 94 fixed in the next adjacent member 26 centrally of the corresponding groove 22. Each spring 62 extends approximately half way around its associated groove 22 and the spring 90 in one groove 22 urges its corresponding member 26 in one direction of rotation about the axis of the device while the other spring urges its corresponding member 26 in the opposite direction of rotation, this direction of rotation as shown and described as being preferable and being that necessary to move gaging members 36 radially inwardly toward engaging relation with respect to a piece of work inserted between them.

With the construction described when it is desired to gage a piece of work the operator inserts a thumb in one of the openings 30 and a finger in the other opening 30 and draws the handle members 28 toward one another to approximately the position illustrated in Fig. 4 in which the gaging members 36 are moved radially outwardly to their maximum extent and in which position of the gaging members a piece of work such as the screws 52 illustrated in Fig. 11 may be freely inserted or withdrawn from between the inner ends of the gaging members. When the work is thus positioned between the inner ends of the gaging members 36 the operator simply relieves the pressure he has exerted to move the handle members 28 toward one another upon which the springs 90 cause the members 26 to be rotated in the opposite direction of rotation, and correspondingly cause the gaging members 36 to move radially inwardly until they firmly engage the piece of work with a pressure which, of course, is dependent upon the strength of the springs 90, upon which the relative pitch diameter of the piece of work as compared to the tolerated limits thereof is instantly visible through inspection of the relative position of the mark 80 with respect to the marks 82 and 84. The relative size having thus been indicated the operator then draws the handle portions 28 toward each other to free the work from the gaging members 36, the work is removed and replaced by a new piece of work, whereby the above described sequence of operation is repeated.

It will be appreciated that the present invention entirely eliminates the necessity of threading a piece of work into the gage as is necessary in connection with conventional ring thread gages and that a single gage in this case visually indicates whether the work is within both the maximum and minimum tolerated dimensions thereof. It, therefore, provides a means whereby the accuracy in the pitch diameter of threaded parts may be quickly and accurately determined in a simple and economical manner.

At first glance it might appear that the device of the present invention required extremely accurate machining of a high order in the manufacture of the same, but on further study it will be appreciated, particularly where three equally angularly spaced gaging members such as 36 are employed, that such is not the case for the following reasons. Let it be assumed for instance that the cam surfaces 64 are not exactly the same or are not positioned in exactly the desired relation with respect to each other. Under such circumstances it will be understood that when the gaging members 36 are moved inwardly to engage a piece of work between them, if the gaging members do not all equally engage the corresponding cam surfaces 64 they will nevertheless continue to move radially inwardly, shifting the work if necessary, or the operating members 26 themselves will shift either relative to each other or the housing members 20, until equal engagement of all the gaging members with the work and with their corresponding cam surfaces 64 will occur. Where two actuating members such as 26 are employed in reverse position such as illustrated in Figs. 1 to 7, inclusive, and the above described condition or conditions prevails between the gaging members 36 and the cam surfaces 64 of both the actuating members 26, then the actuating members 26 themselves may shift relative to each other in any radial direction required until all the cam surfaces 64 of both of the actuating members 26 bear with equal pressure upon the ends of the corresponding gaging members 36. Where three gaging members 36 are employed as illustrated such shifting movement of the members will have no effect on the proper engagement of the gaging members with the work because of the well understood centering effect of three equally angularly disposed parts upon a piece of work confined between them.

Any possible shifting of the various parts as above described will have no effect on the proper gaging of the work because the "go" and "no-go" marks or lines 82 and 84 are formed only to correspond with equivalent positions of the handle members 28 for each particular size and tolerances of the part to be gaged. In other words, in establishing the line 84, for instance, a master threaded part or screw is made up with the pitch diameter thereof at the maximum tolerated dimension permitted, it is inserted between the gaging members 36 and the gaging members 36 are brought into gaging relation with respect to the same. The mark 84 is then formed on the surface 32 of the corresponding handle portion 28 in line with the pointer mark 80. Such master is then removed and replaced by another master whose pitch diameter is at the minimum tolerated dimension permitted for the part to be gaged, whereupon the gaging members 36 are now engaged with this new master and the line 82 is formed on the surface 32 of the corresponding handle portion 28 in line with the pointer mark 80. The device is, therefore, accurately gaged individually to the parts to be gaged thereby and any variation of one device with respect to another device because of any small inaccuracies in manufacture are entirely eliminated in the final establishment of the "go" and "no-go" indicia thereon.

In event a device, having once been calibrated to properly gage the pitch diameter of a screw threaded part having one value of tolerated dimensions is to be used on a new part having a different amount of tolerated dimensions, the indicia 80, 82 and 84 may be simply removed by filing or otherwise, and the device re-calibrated in the same general manner as previously described to accommodate it to the new such conditions.

It will be understood that each device as above described is limited to the gaging of the pitch diameter of screw elements all having substantially the same pitch diameter. Within reasonable limits, however, it may be adapted to gage screw elements of a different pitch diameter by replacing the gaging elements 36 only with like gaging elements of greater or lesser radial length, as will be readily appreciated by those skilled in the art, so that it will be unnecessary in all cases to replace the entire device when it is desired to gage threaded elements of a slightly different pitch diameter. Whenever such change is made, however, re-calibration of the device may be required as above explained.

The construction illustrated in Figs. 1 to 7, inclusive, for effecting rapid withdrawal of the gaging members 36 from and adjacent their actual gaging position, that is through the interengagement of the surfaces 69 and 70, may be accomplished in other ways in accordance with the broader aspects of the present invention. As illustrative of one other way in which this may be accomplished a modified form of construction is illustrated in Figs. 8 and 9. In these figures all parts are identical to those in the previous figures except as modified in the particular manner described and, accordingly, the description of these modifications will serve, in view of the description of the construction of previous figures, to disclose the entire construction without actually going into all of the details thereof. For this reason and to simplify the description of the construction shown in Figs. 8 and 9, parts equivalent to those shown in Figs. 1 to 7 are indicated by the same numerals except that such numerals bear the sub-letter "a." As best illustrated in Fig. 8, the outer end of the gaging members here indicated as 36a are rounded off at the radially outer end the same as in the first construction but are devoid of the notches forming the cam surfaces 70 employed in the first described construction. In this case each gaging member 36a is provided with a central slot 100 therethrough, and a pin 102 fixed in one of the cover members 20a projects into each of the slots 100. A coil spring 104 is maintained under compression between each pin 102 and the outer end of the slot 100 in the corresponding gaging member 36a so as to constantly urge the gaging member 36a in a radially outward direction. The pockets 68a formed in the members 26a for reception of the outer ends of the gaging members 36a are devoid of an angular surface such as the surface 69 in the previously described construction, although the opposite side of each pocket 68a is inclined the same as in the previously described construction so that upon relative rotation of the members 26a when the gaging members 36a are received in the pockets 68a the gaging members 36a will be projected inwardly and be brought into contact with the cam surfaces 64a in the same general manner as the construction previously described. Otherwise the constructions are identical.

In the construction illustrated in Figs. 8 and 9, when the members 26a are rotated to a position to bring the pockets 68a into alignment with the gaging members 36a the springs 104 will project the radially outer ends of the gaging member 36a into the pockets 68a and thus separate the radially inner faces 48 of the gaging members 36a to a sufficient extent to permit direct axial withdrawal or insertion of the work to be gaged. Where springs, such as springs 90 described in connection with the structure shown in Figs. 1 to 7, inclusive, are employed in the structure shown in Figs. 8 and 9, it will be appreciated, of course, that they will be of sufficient strength to overcome the force of springs 104 in moving the member 26a relative to each other to project the gaging member 36a radially inwardly into gaging relation with respect to a piece of work inserted between them, upon release of manual pressure of the handle portions 28a thereof.

It has been previously suggested herein that the device shown and described may be simply associated with a conventional indicator gage and mounted as the bench type of gage, and that in such case only one of the members 26 or 26a will be required in view of the additional magnification of the movement of the gaging member provided by the indicator gage. Such a construction is suggested in Fig. 10.

The construction of the gage device proper in Fig. 10 may be identical to that illustrated in Figs. 1 to 7, for instance, except that only one member equivalent to the member 26 in Figs. 1 to 7 is employed. For this reason the various parts illustrated for the gage proper in Fig. 10 are illustrated by the same numerals as in Figs. 1 to 7, inclusive, except that such numerals bear the submark "b" and, except for the changes hereinafter shown or described, it will be understood to operate in the same manner. In this instance, in view of the fact that only one member 26b is employed, it will be appreciated that it will either be required to be of a thickness equal to the combined thickness of both members 26 in the first described construction or, if of the same thickness as one of them, then the main body portion 38 of the gage members 36 and the segment members 42 will be accordingly reduced in thickness to correspond. In this case, instead of providing an extension such as extension 34 on the handle portion 28b of member 26b, one side of such handle portion will preferably be formed to provide a substantially flat surface as indicated at 110 disposed in approximately radial-relation with respect to the center of the gage.

A base plate such as 112 is provided adapted to seat or to be secured upon a bench or like supporting surface and is provided with suitable means thereon for removably clamping the gaging device in position. In the particular case shown the base 112 is provided with a pair of upstanding spaced blocks 114 between which the lower edge of the gage device is received and clamped by suitable means such as a bolt 116 and thumb screw 118. The gage device is preferably so supported between the blocks 114 that the surface 110 thereof is positioned in an approximately horizontal plane when in gaging position.

Fixed to the base 112 and at the rear edge thereof is a vertically extending post 120 upon which is vertically slidably received a forwardly extending arm 122 which may be releasably locked in any desired vertical position by means of a thumb screw 124. The forward or free end of the arm 122 is disposed directly above the surface 110 of the gage device and is centrally apertured for receiving the stem 126 of an indicator gage 128 which is secured therein in vertically adjustable position by means of a thumb screw 130. The contact point 132 of the indicator 128 extends downwardly into contacting relationship with respect to the surface 110 of the gage device. The indicator gage 128 may be of conventional construction having a face 134 over which a pointer 136 is adapted to sweep together with a pair of limit arms 138 and 140 which may be positioned to indicate the maximum and minimum tolerated positions permitted for the part to be gaged.

In the arrangement illustrated in Fig. 10 the handle portion 28b of the actuating member 26b is moved downwardly to cause separation of the engaging ends 40b of the gage members to permit the insertion or removal of a piece of work from between the same. Upon insertion of a piece of work the downward pressure on the handle portion 28b is relieved whereupon a spring equivalent to the springs 90 previously described will cause the member 26b to rotate in a clockwise direction of rotation as viewed in Fig. 10, bringing the surface 110 in contact with the contact point 132 of the indicator 128 and registering the fully engaged position of the gaging members on the work by the pointer 136 on the face 134. Where the stop pointers 138 and 140 have been properly located it will be appreciated that if the pointer 136 comes to rest between them in such case it indicates that the piece of work is within the tolerated dimensions, otherwise it is not and, therefore, not acceptable.

The same type of gage device illustrated in Figs. 1 to 7, inclusive, and if desired modified as disclosed in Figs. 8 and 9 or otherwise, may be utilized in substantially identical form in a different and preferred form of bench type gage as illustrated in Figs. 12 to 15, inclusive. It may be assumed for the purpose of illustration that the gage device itself illustrated in Figs. 12 to 15, inclusive, is identical to that illustrated in Figs. 1 to 7, inclusive, except that the springs 90 may be dispensed with if desired and except that the handle portion 28, instead of being formed to provide the thumb and finger holes 30 and the extended portions 34, are in this case replaced by short straight portions indicated at 28c. The remaining portions of the gage device itself being identical to that in Figs. 1 to 7, inclusive, are indicated by the same numerals as employed in Figs. 1 to 7, inclusive, and the construction of the same will thus be understood without describing and showing it in detail.

For the purpose of the bench type of gage illustrated in Figs. 12 to 15, inclusive, a frame forming a part of an enclosing housing is provided and consists of a base 150, an upwardly directly and relatively straight back frame member 152, and a curved front member 154 which joins the base 150 adjacent the forward end thereof and which curves upwardly and rearwardly on the arc of a circle and is joined to the upper end of the back frame member 152. The forward end of the base 150 is of wider conformation than the rear end thereof and is provided at each side with a foot 156 while a single central foot 158 is provided at the rear end of the base 150. The front member 154 is preferably of the same width as the base 150 at its lower end and gradually reduces in width to its point of connection with the rear member 152. The front member 154 is provided with a central slot 160 best brought out in Fig. 14 and which extends from a point adjacent the base 150 to a point adjacent the point of connection of the member 154 with the member 152.

Projecting upwardly from the base 150 approximately centrally thereof is a block or support 162 preferably formed integrally with the base 150. One of the projecting ends 28c of one of the operating members 26 and as best brought out in Fig. 15 lies in flat contacting relation with respect to one side face of the support 162 and is provided with a pair of openings 164 in which are received the pointed ends of cooperating locating screws 166 threaded through the support 162. The screws 166 thus serve to locate this member 26 in a predetermined relation with respect to the support 162. In order to hold this member 26 in such position a clamping plate 168 is drawn towards the support 162 by means of a screw 170 and clamps the forwardly projecting end 28c of the corresponding operating member 26 securely between it and the support 162. By this means the gaging device is rigidly fixed with respect to the base 150 and the cooperating portions of the frame, the gage device in such case being supported as indicated in Fig. 12 centrally of the lower corner of the frame with its axis concentric with the outer surface of the frame front member 154.

The end 28c of the remaining operating member 26 has secured thereto, as by means of screws 172, the inner end of a radially projecting rigid arm 174 extended as at 176 in one direction circumferentially of the center of the gage device and circumferentially in the opposite direction as at 178. The end 176 has fixed thereto as by means of screws 180 an operating member 182 which projects out through the slot 160 in the front member 154 and outwardly thereof is provided with a fingerpiece 184 by means of which the operator, through engagement with his finger therewith, may move it downwardly, as to the position shown in dotted lines in Fig. 12, to so relatively move the operating members 26 as to separate the gaging members 36 from each other in a radial direction in order to permit reception of a piece of work therebetween.

The extended end 178 of the arm 174 is provided with a slot 186 concentric with the axis of the gage device and with the outer surface of the front frame member 154. A pair of indicator members 188 and 190, preferably formed from sheet or plate metal, are secured in flat contacting relation with respect to the side face of the end 178 and are clamped rigidly thereto by means of screws 192 which project through the slot 186 and are threaded into the members 188 and 190. The members 188 and 190 project outwardly through the slots 160 to a position slightly beyond the outer face of the front member 154. In order to maintain them against relative rotation with respect to the axes of their corresponding screws 192, ears 194 are preferably struck laterally therefrom and are relatively closely received in the slot 186. It will be appreciated that by loosening the screws 192 the gage members 188 and 190 may be shifted longitudinally of the slot 186 relative to the end portion 178 and relative to each other.

The outer face of the front member 154 at a position approximately between the gage members 188 and 190 when in normal position engaging a piece of work to be gaged by the device is provided with an outstanding pad 196 on each side of the slot 160 and this pad is preferably provided with a transverse line, such as indicated at 198 in Fig. 14, to provide an indicating mark.

The members 188 and 190 cooperate with the indicator mark 198 to indicate the relative size of a workpiece gaged by the device, and the members 188 and 190 are so adjusted in the length of the slot 186 that their adjacent upper corners indicate, in their relation to the indicator mark 198 on the frame, whether the piece of work gaged by the device is within the tolerated limits therefor. In this respect it will be appreciated that although one of the operating members 26 is stationary in this case and only one moves, because the gage device itself is supported by one of the members 26, the same amount of movement of one of the operating members with respect to the other, that is double the amount of movement required by one operating member to move the gaging members 36 into gaging relationship with respect to the work, is provided in this case between the members 188 and 190 and the frame of the device. The same magnification of relative movement between the members 26 is thus provided to indicate the relative size of the parts to be gaged.

Thus with the type of construction illustrated in Figs. 12 to 15, inclusive, in order to set the device for properly engaging a particular sized workpiece, a master workpiece at the permissible low limit of size is first inserted in the gage device by pressing down the fingerpiece 184, inserting the master workpiece, and then releasing the pressure on the fingerpiece 184 to permit the gaging members 36 to move radially inwardly and grip the master workpiece between them. The screw 192 for the member 188 is then loosened and the member 188 is shifted longitudinally of the slot 186 until its upper outer edge is in alignment with the indicator mark 198, upon which the screw 192 is tightened up to lock the member 188 in such position. This master workpiece is then removed and replaced by one at the high permissible limit of size and the operation is repeated but in this case it is the member 190 that is shifted longitudinally of the slot 186 to bring its outer forward edge into alignment with the indicator mark 198. As will be appreciated, any workpiece thereafter gaged to be of the correct size must be such that the arm 174 in moving upwardly upon release of pressure on the thumbpiece 184 will come to rest with the indicator mark 198 between the opposed outer corners of the members 188 and 190, otherwise the workpiece is not within the tolerated dimensions.

As previously mentioned the gage device itself employed in the bench gage illustrated in Figs. 12 to 15, inclusive, has been considered to be identical to that illustrated in Figs. 1 to 7, inclusive, except for the handle portions thereof, and this may in fact be true in all respects. However, with the type of construction illustrated in Figs. 12 to 15, inclusive, the weight of the member 174 and parts carried thereby is so much greater than the equivalent weight of a handle portion such as 28 in the construction shown in Figs. 1 to 7, inclusive, that it would be difficult to provide springs such as 90 of sufficient weight and mounted in the same manner as the springs 90 to accomplish the desired result. For this reason it is desirable to provide an external spring, either alone or in combination with springs such as 90 to effect the desired closing movement of the gage device. Such a spring may be connected between the frame and the member 174, for instance, to constantly urge the member 174 in the desired direction of movement which as above explained is preferably in a direction to move the gaging members 36 in a radial inward direction. Furthermore, because of the relative weight of the member 174 and parts carried thereby it will be appreciated that if such springs as may be employed for the above described purpose are of the desired strength then, should a workman after depressing the thumb piece 184 take his thumb off of the same, the springs in pulling these parts upwardly might have the effect of jamming the gaging members 36 into contact with the work as a result of the inertia thereof and the amount of this jamming force might depend upon the particular point in the path of movement of the thumb piece 184 that the workman removes his thumb or finger. For this reason it is desirable to provide some means for preventing the inertia of the member 174 and parts carried thereby from building up an undesirable degree of momentum of the gaging members on the work under such circumstances. A dash pot suitably connected between the member 174 and the frame may suffice for this purpose and in such case the spring and the dash pot may desirably be incorporated in a single structure and this is shown in Fig. 12 by way of preference.

Referring to Fig. 12 it will be noted that a cylinder 200 is provided with a closed end carrying an ear or flange 202 which is pivotally connected by means of a pin 204 to the upward extension 178 of the member 174 for movement substantially in the plane of movement of the arm 174. Reciprocably received within the cylinder 200 is a piston 206 provided with a piston rod 208 which projects through a plug 210 movably fixed in the open end of the cylinder 200 and its outer end is laterally bent and pivotally received in a forwardly projecting rib or flange 212 formed integrally with the rear frame member 152 for movement about an axis parallel with the axis of the pin 204. A coil spring 214 surrounds the rod 208 within the cylinder 200 and is maintained under compression between the piston 206 and the end member 210. The normal effect of the spring 214 is, therefore, to shorten the distance between the pin 204 and that end of the rod 208 which is pivoted in the rib 212 and thus to cause the member 174 and the operating member 26 to which it is connected to rotate in a clockwise direction of rotation about the axis of the gaging member as viewed in Fig. 12, this being the direction of movement of the member 174 required to move the gaging members 36 in a radially inward direction to engage a piece of work positioned between them. The relation of the length of the rod 208 to the length of the cylinder 200 is preferably such that, as will be appreciated from an inspection of Fig. 12, the piston 206 will contact the end of the cylinder 200 before the indicating member 190 strikes the upper end of the slot 160, thereby serving as a stop for limiting the upward movement of the member 174. During such upward movement of the member 174 the piston 206 will tend to compress air between it and the closed end of the cylinder 200 and thus retard the speed of movement of the member 174 upwardly under the force of the spring 214. The fit of the piston 206 in the cylinder 200 may be sufficiently loose to permit the required passage of air between the piston and the cylinder for regulating this damping effect or, if desired, a small bleed hole such as 216 may be provided in the closed end of the cylinder 200 where the piston 206 is a relatively tight fit in the cylinder. In addition a port hole 218 may be provided in the wall of the cylinder 200 outwardly of the piston 206 at such position that when the thumb piece 184 is at or adjacent its lowermost position, shown in dotted lines in Fig. 12, the piston 206 will have moved outwardly of the cylinder 200 to a sufficient extent to uncover the port 218 and permit air to flow into the cylinder between its closed end and the piston, thereby relieving any partial vacuum that may have been created by the outward travel of the piston in the cylinder, and insuring a full charge of air in the cylinder for the following stroke of the handle member 174.

In a bench type of gage such as illustrated in Figs. 12 to 15, inclusive, it is preferable to enclose the operating mechanism as much as possible and, for the purpose of providing this closure, a sheet metal plate 220 is provided on each side of the framework and is shaped to substantially close the opening on each side of the framework between the base 150 and the members 152 and 154, each metal plate 220 being provided with an aperture 222 centrally aligned with the gage device itself to thus permit ready insertion of the work to be tested into the gage device and removal of the work therefrom. In the particular case shown each plate 220 is removably secured in place by a pair of ears 224 which are formed integrally with each cover plate 220 and are received in complementary slots formed in the inner face of the forward frame member 154. The corner of each plate 220 adjacent the junction of the base 150 and rear member 152 is removably secured in place by means of a screw 226 projected through such corner of the plate and threaded into a boss 228 provided centrally of the plate at this position. The screws 226 thus provide the only means which must be applied or removed in applying or removing the plates 220.

Having thus described my invention, what I claim by Letters Patent is:

1. In a device of the type described, in combination, a plurality of gaging members arranged in angularly spaced relation with respect to each other about a common axis, each of said gaging members having a radially inner face approximately complementary in shape and contour to a portion of the threaded surface of a part to be gaged thereby, means for guiding said gaging members for movement radially of said axis, and a ring-like member surrounding all of said gaging members, said ring-like member having angularly spaced cam surfaces on its radially inner face corresponding in number to the number of said gaging members and engaging the outer ends of said gaging members to move them gradually radially inwardly to gaging position upon relative rotation of said ring-like member in one direction, said ring-like member also having a radially outwardly directed pocket therein at one end of each of said cam surfaces of a size to receive the radially outer end of the corresponding of said gaging members therein, and means for projecting said radially outer ends of said gaging members into said pockets upon relative rotation of said ring-like member in the opposite direction.

2. In a device of the type described, in combination, a plurality of gaging members arranged in angularly spaced relation with respect to each other about a common axis, each of said gaging members having a radially inner face approximately complementary in shape and contour to a portion of the threaded surface of a part to be gaged thereby, means for guiding said gaging members for movement radially of said axis, and a ring-like member surrounding all of said gaging members, said ring-like member having angularly spaced cam surfaces on its radially inner face corresponding in number to the number of said gaging members and engaging the outer ends of said gaging members to move them gradually radially inwardly to gaging position upon relative rotation of said ring-like member in one direction, said ring-like member also having a radially outwardly directed pocket therein at one end of each of said cam surfaces of a size to receive the radially outer end of the corresponding of said gaging members therein, one side of each of said pockets being formed to provide a cam surface, the outer end portions of said gaging members being formed to provide a complementary cam surface, and the last two mentioned cam surfaces cooperating with each other upon relative rotation of said ring-like member in the opposite direction to withdraw the outer ends of said gaging members into said pockets.

3. In a device of the type described, in combination, a plurality of gaging members arranged in angularly spaced relation with respect to each other about a common axis, each of said gaging members having a radially inner face approximately complementary in shape and contour to a portion of the threaded surface of a part to be gaged thereby, means for guiding said gaging members for movement radially of said axis, a pair of concentric ring-like members surrounding all of said gaging members, said ring-like members being rotatable about said axis and having cam surfaces thereon operatively engaging the radially outer ends of said gaging members for controlling the radial positions of said gaging members in accordance with the rotatable positions of said ring-like members with respect thereto, said cam surfaces on one of said ring-like members being reversed to those of the other of said ring-like members whereby rotational movement of said ring-like members in a direction opposite to each other effects radial movement of all of said gaging members in the same direction.

4. In a device of the type described, in combination, a plurality of gaging members arranged in angularly spaced relation with respect to each other about a common axis, each of said gaging members having a radially inner face approximately complementary in shape and contour to a portion of the threaded surface of a part to be gaged thereby, means for guiding said gaging members for movement radially of said axis, a pair of concentric ring-like members surrounding all of said gaging members, said ring-like members being rotatable about said axis and having cam surfaces thereon operatively engaging the radially outer ends of said gaging members for controlling the radial positions of said gaging members in accordance with the rotatable positions of said ring-like members with respect thereto, said cam surfaces on one of said ring-like members being reversed to those of the other of said ring-like members whereby rotational movement of said ring-like members in one direction opposite to each other effects radial movement of all of said gaging members in a radially inward direction, and means cooperating between said ring-like members and said gaging members for effecting radial movement of all of said gaging members in a radially outward direction upon relative rotation of said ring-like members in the other direction.

5. In a device of the type described, in combination, a plurality of gaging members arranged in angularly spaced relation with respect to each other about a common axis, each of said gaging members having a radially inner face approximately complementary in shape and contour to a portion of the threaded surface of a part to be gaged thereby, means for guiding said gaging members for movement radially of said axis, a pair of concentric ring-like members surrounding all of said gaging members, said ring-like members being rotatable about said axis and having cam surfaces thereon operatively engaging the radially outer ends of said gaging members for controlling the radial positions of said gaging members in accordance with the rotatable positions of said ring-like members with respect thereto, said cam surfaces on one of said ring-like members being reversed to those of the other of said ring-like members whereby rotational movement of said ring-like members in one direction opposite to each other effects radial movement of all of said gaging members in the same direction, and spring means constantly urging said ring-like members in said direction of rotation.

6. In a device of the type described, in combination, a plurality of gaging members arranged in angularly spaced relation with respect to each other about a common axis, each of said gaging members having a radially inner face approximately complementary in shape and contour to a portion of the threaded surface of a part to be gaged thereby, means for guiding said gaging members for movement radially of said axis, a pair of concentric ring-like members surrounding all of said gaging members, a pair of housing members slidably embracing said gaging members and said ring-like members between them, said ring-like members being rotatable about said axis and having cam surfaces thereon operatively engaging the radially outer ends of said gaging members for controlling the radial positions of said gaging members in accordance with the rotatable positions of said ring-like members with respect thereto, said cam surfaces on one of said ring-like members being reversed to those of the other of said ring-like members whereby rotational movement of said ring-like members in a direction opposite to each other effects radial movement of all of said gaging members in the same direction, said ring-like members each having a radially outwardly directed pocket therein at that end of each of said cam surfaces located at the greatest radial distance from said axis, said pockets being of a size sufficient to receive the radially outer ends of said gaging members therein when radially aligned therewith, and the sides of said pockets and said gaging members being so constructed and arranged that inter-engagement thereof during rotational movement of said ring-like members effects relatively rapid radial movement of said gaging members.

7. In a gage device of the type described, in combination, a plurality of gaging members each having a radially inner end surface complementary in shape and contour to a portion of the threaded external surface of a part to be engaged, means for guiding said members toward and from a part to be gaged and received between them, means for effecting movement of said members toward a gaging position comprising a pair of ring-like members surrounding all of said gaging members and provided with cam surfaces operatively engaging said gaging members and operative upon relative rotation thereof with respect to said gaging members to move said gaging members inwardly with respect thereto, a frame, means for fixing one of said ring-like members with respect to said frame, an arm fixed with respect to the other of said ring-like members and projecting outwardly therefrom, and means cooperating between the outer end of said arm and said frame for indicating the radially inward position of said gaging members with respect to a piece of work engaged between them.

8. In a gage device of the type described, in combination, a plurality of gaging members each having a radially inner end surface complementary in shape and contour to a portion of the threaded external surface of a part to be engaged, means for guiding said members toward and from a part to be gaged and received between them, means for effecting movement of said members toward a gaging position comprising a pair of ring-like members surrounding all of said gaging members and provided with cam surfaces operatively engaging said gaging members and operative upon relative rotation thereof with respect to said gaging members to move said gaging members inwardly with respect thereto, a frame, means for fixing one of said ring-like members with respect to said frame, an arm fixed with respect to the other of said ring-like members and projecting outwardly therefrom, a pair of indicating elements carried by the outer end of said arm, and indication means on said frame cooperating with said indicating elements to indicate the relative size of a workpiece engaged by said gaging members.

9. In a gage device of the type described, in combination, a plurality of gaging members each having a radially inner end surface complementary in shape and contour to a portion of the threaded external surface of a part to be engaged, means for guiding said members toward and from a part to be gaged and received between them, means for effecting movement of said members toward a gaging position comprising a pair of ring-like members surrounding all of said gaging members and provided with cam surfaces operatively engaging said gaging members and operative upon relative rotation thereof with respect to said gaging members to move said gaging members inwardly with respect thereto, a frame having an arcuate outer face, means for rigidly securing one of said ring-like members to said frame in substantially coaxial relation with respect to said arcuate face, an arm fixed to the other of said ring-like members and extending into cooperative relation with respect to said arcuate face, a pair of indicating elements mounted on the outer end of said arm in cooperative relation with respect to said arcuate face and for shiftable movement circumferentially of said ring-like members, said arcuate face having an indicating mark thereon for cooperation with said indicating elements on said arm, and means associated with said arm for moving said ring-like members relative to one another.

10. In a gage device of the type described, in combination, a plurality of gaging members each having a radially inner end surface complementary in shape and contour to a portion of the threaded external surface of a part to be engaged, means for guiding said members toward and from a part to be gaged and received between them, means for effecting movement of said members toward a gaging position comprising a pair of ring-like members surrounding all of said gaging members and provided with cam surfaces operatively engaging said gaging members and operative upon relative rotation thereof with respect to said gaging members to move said gaging members inwardly with respect thereto, a frame having an arcuate outer face, means for rigidly securing one of said ring-like members to said frame in substantially co-axial relation with respect to said arcuate face, an arm fixed to the other of said ring-like members and extending into cooperative relation with respect to said arcuate face, a pair of indicating elements mounted on the outer end of said arm in cooperative relation with respect to said arcuate face and for shiftable movement circumferentially of said ring-like members, said arcuate face having an indicating mark thereon for cooperation with said indicating elements on said arm, spring means cooperating with said arm constantly urging one of said ring-like members in one direction of rotation relative to the other of said ring-like members, and means associated with said arm for moving said arm against the force of said spring means.

11. In a gage device of the type described, in combination, a plurality of gaging members each having a radially inner end surface complementary in shape and contour to a portion of the threaded external surface of a part to be engaged, means for guiding said members toward and from a part to be gaged and received between them, means for effecting movement of said members toward a gaging position comprising a pair of ring-like members surrounding all of said gaging members and provided with cam surfaces operatively engaging said gaging members and operative upon relative rotation thereof with respect to said gaging members to move said gaging members inwardly with respect thereto, a frame having an arcuate outer face, means for rigidly securing one of said ring-like members to said frame in substantially coaxial relation with respect to said arcuate face, an arm fixed to the other of said ring-like members and extending into cooperative relation with respect to said arcuate face, a pair of indicating elements mounted on the outer end of said arm in cooperative relation with respect to said arcuate face and for shiftable movement circumferentially of said ring-like members, said arcuate face having an indicating mark thereon for cooperation with said indicating elements on said arm, spring means constantly urging said arm in a direction to move said gaging members toward gaging position, and means for damping the movement of said arm under the force of said spring.

12. In a gage device of the type described, in combination, a plurality of gaging members each having a radially inner end surface complementary in shape and contour to a portion of the threaded external surface of a part to be engaged, means for guiding said members toward and from a part to be gaged and received between them, means for effecting movement of said members toward a gaging position comprising a pair of ring-like members surrounding all of said gaging members and provided with cam surfaces operatively engaging said gaging members and operative upon relative rotation thereof with respect to said gaging members to move said gaging members inwardly with respect thereto, a frame having an arcuate outer face, means for rigidly securing one of said ring-like members to said frame in substantially coaxial relation with respect to said arcuate face, an arm fixed to the other of said ring-like members and extending into cooperative relation with respect to said arcuate face, a pair of indicating elements mounted on the outer end of said arm in cooperative relation with respect to said arcuate face and for shiftable movement circumferentially of said ring-like members, said arcuate face having an indicating mark thereon for cooperation with said indicating elements on said arm, a cylinder pivotally mounted on said arm, a piston slidable in said cylinder, a rod fixed to said piston and pivotally connected to said frame, and spring means constantly acting between said piston and cylinder tending to move said arm in that direction required to move said gaging members toward a gaging position.

GEORGE HOHWART.

REFERENCES CITED

The following references are of record in the file of this patent:

UNITED STATES PATENTS

| Number | Name | Date |
| --- | --- | --- |
| 1,630,690 | Bosle et al. | May 31, 1927 |
| 2,249,954 | Hellberg et al. | July 22, 1941 |

FOREIGN PATENTS

| Number | Country | Date |
| --- | --- | --- |
| 113,536 | British | Feb. 28, 1918 |
| 791,534 | French | Dec. 12, 1935 |

Certificate of Correction

Patent No. 2,419,263.   April 22, 1947.

GEORGE HOHWART

It is hereby certified that errors appear in the printed specification of the above numbered patent requiring correction as follows: Column 3, line 73, for "rings" read *ring gages*; column 9, line 63, for the reference numeral "62" read *92*; column 22, line 9, claim 11, for "fired" read *fixed*; and that the said Letters Patent should be read with these corrections therein that the same may conform to the record of the case in the Patent Office.

Signed and sealed this 24th day of June, A. D. 1947.

[SEAL]

LESLIE FRAZER,
*First Assistant Commissioner of Patents.*